Aug. 15, 1967     H. M. ALLARD ET AL     3,335,463
INJECTION MOLDING MACHINE
Filed Nov. 5, 1964                    2 Sheets-Sheet 1

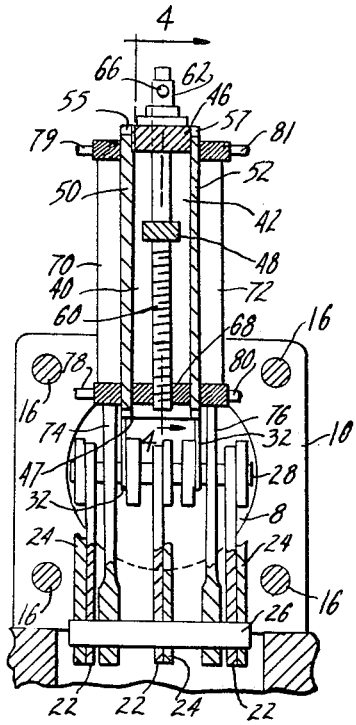

# United States Patent Office 3,335,463
Patented Aug. 15, 1967

3,335,463
INJECTION MOLDING MACHINE
Harrie M. Allard, Nashua, and Henry R. Parker, New Boston, N.H., assignors to Improved Machinery Inc., Nashua, N.H., a corporation of Delaware
Filed Nov. 5, 1964, Ser. No. 409,111
8 Claims. (Cl. 18—30)

This invention relates to an improved injection molding machine and more particularly to an adjustable force applying toggle linkage therefor, whereby the stroke of said machine may be varied as desired.

Various injection molding machines have been devised in the past for applying extreme pressure as molding platens are moved together and the molding material is injected into the molding cavity. To avoid the use of oversize machinery, however, force multiplying toggle linkages have been incorporated in certain of such machines for moving the platens together with substantial force. One such toggle linkage is described in Allard, U.S. Patent No. 2,969,818 and includes a self-supporting toggle linkage in which the entire thrust of the linkage is confined to the force system acting between the movable molding platen and a fixed base.

The Allard toggle linkage, however, as is also the case with other linkage systems, moves the movable platen a fixed distance on each stroke, the length of such stroke being sufficiently large to accommodate the largest molds and to provide sufficient space for changing molds. But when such an injection molding machine is operating the stroke need only be sufficient for the molded article to be removed from the molds. Any longer stroke than this is inefficient as it necessarily lengthens the time between each stroke and thus cuts down on the volume of production which the machine can handle per unit time.

Thus, the present invention has for a purpose the provision of adjustable toggle linkage means for varying the stroke of injection molding apparatus thereby to provide greatly increased operating efficiency.

In addition, the present invention also has for a purpose the provision of toggle linkage means which are particularly constructed and arranged to increase the clamping force of injection molding apparatus.

To accomplish the purposes of this invention, a novel toggle linkage means is provided for a molding machine comprising a clamping platen and a movable mold-carrying platen. The toggle linkage means, in the illustrated embodiment of the invention, comprises a pair of links pivotally connected at a toggle junction to each other, one of said links also being pivotally connected to the clamping platen and the other of said links being pivotally connected to the movable platen. Link actuating means are pivotally connected at one end thereof to the toggle junction. To provide for an adjustable stroke, the other end of the hydraulic actuating means is movably mounted to a frame member to which the support members are pivotally connected. Adjustment means are also provided on said frame member, which means are connected to the slide member for selectively raising and lowering the actuating means for varying the stroke of the movable platen. Support for the frame member and hydraulic actuating means is provided by support arms pivotally connected to and extending at one end from the clamping platen and the movable platen pivotally connected at the other end to the frame member. Stop means are also provided for preventing movement of said links past a, preferably horizontal, position of lengthwise alignment as they are moved from an open to a closed platen position. Operational safety is provided by arranging the toggle junction to be below the position of lengthwise alignment when the molds are open.

The toggle linkage thus described may be adjusted vertically to raise and lower the link actuating means and thus to vary the stroke of the movable platen. Thus in the preferred embodiment shown in the drawings, adjustment of the actuating means upwardly will shorten the stroke. The stroke can thereby be varied to suit the particular purposes.

Other details, features, and advantages of this invention will be apparent to those skilled in the art from the following detailed description of a preferred embodiment thereof together with the accompanying drawings wherein:

FIGS. 1, 2 and 6 are side elevations of a two-stage molding machine in different operating positions employing a preferred embodiment of the present invention;

FIG. 3 is a sectional view along the line 3—3 of FIG. 1;

FIG. 4 is an enlarged sectional view along the line 4—4 of FIG. 3;

FIG. 5 is a sectional view along the line 5—5 of FIG. 4; and

FIG. 7 is a sectional view along the line 7—7 of FIG. 6.

Figure 1:
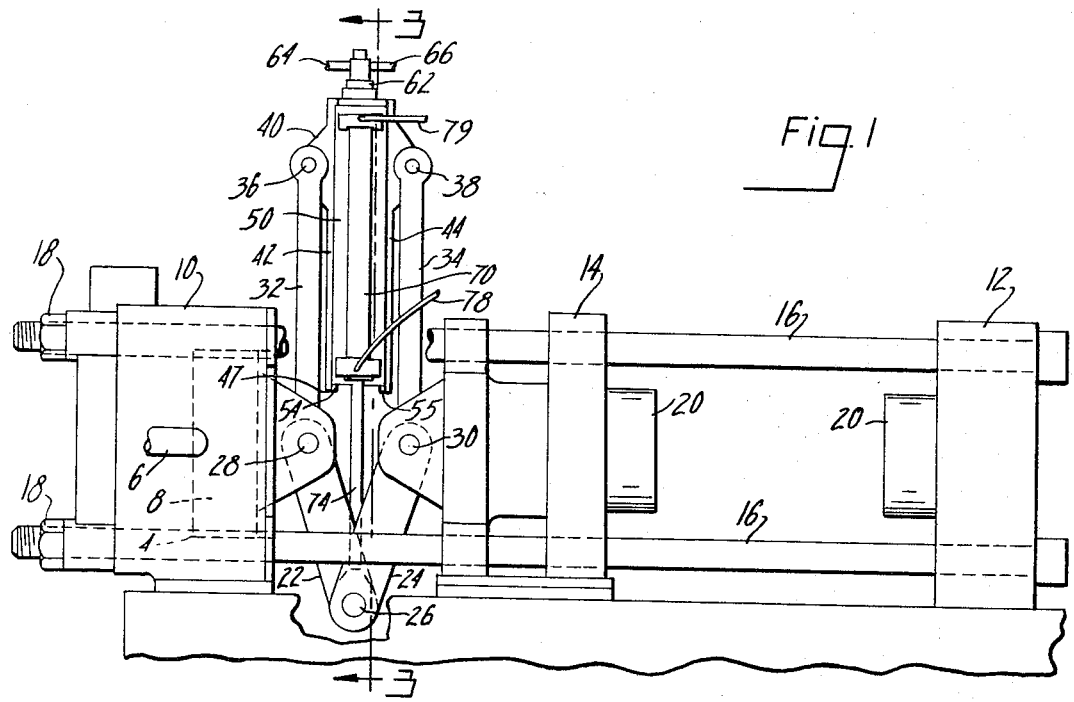
Figure 2:
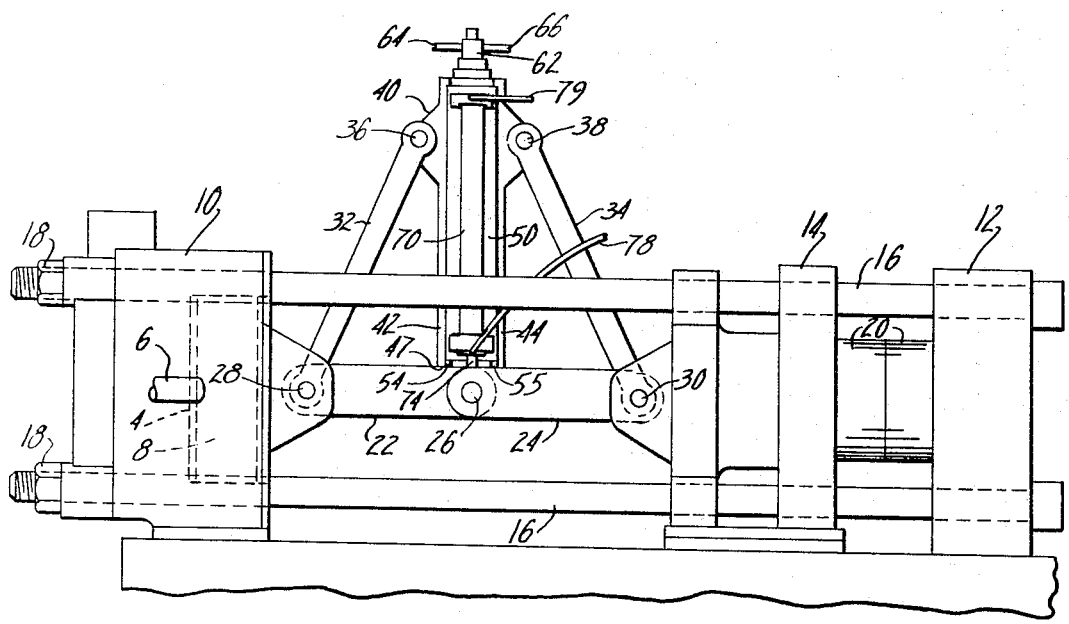

The two-stage injection molding machine shown in FIGS. 1, 2 and 6 includes a fixed base or clamping platen 10, fixed molding platen 12 and a movable molding platen 14 adapted for movement between a mold closed position abutting the fixed platen 12 as in FIG. 2 and a mold open position remote from the fixed platen 12 as in FIG. 1. Preferably the fixed base 10 and the fixed platen 12 are maintained in their relatively fixed positions by tie rods 16 which also function as guide rails for the movable platen 14. Also in the preferred embodiment of the invention the distance between the fixed base 10 and the fixed platen 12 is adjustable by means of nuts 18 on threaded end portions of the tie rods 16 thus to provide means for accommodating molds 20 on the platens 12, 14 of different lengthwise size.

The fixed base 10 in the illustrated preferred two-stage molding machine includes fluid pressure actuating means comprising a hydraulic connection 6 and hydraulically operated piston 8 in cylinder 4 to which is pivotally attached link means 22.

A toggle mechanism to reciprocate the movable platen 14 is provided between that platen 14 and the fixed base 10. The toggle mechanism comprises a pair of link means 22, 24 pivotally connected to each other at their inner ends at pin 26 which constitutes the toggle junction. In the preferred embodiment of this invention the link means 22, 24 are of equal length and each comprise a plurality of link members 22, 24 as in FIGS. 3 and 7. One of the link means 22 is pivotally connected at its outer end at pin 28 to the fixed base 10 on the actuating means therein and the other of the link means 24 is pivotally connected at its outer end at pin 30 to the movable platen 14. The link means 22, 24 are movable between an end-to-end aligned position, FIG. 2, and an angular position, FIGS. 1 and 6, for reciprocating the movable platen 14.

Support means 32, 34 are likewise pivotally connected at the outer ends thereof respectively at pins 28, 30 to the fixed base 10 on the actuating means therein and the movable platen 14. The support means 32, 34 are of lengths greater than and proportional to those of the link means 22, 24 connected to the same pins 28, 30. The inner ends of the support means 32, 34 are pivotally connected at pins 36, 38 to frame member 40 on which link actuating means are mounted.

In general, the frame member 40 comprises an inverted U-shaped piece defining a longitudinal axis thereof in a plane normal to the aligned position of the link means 22, 24, FIG. 2. The frame member 40 has a pair of wall members 42, 44 adjacent the support means 32, 34. The wall members 42, 44 are connected as in FIG. 4 by an upper transversely extending portion 46 and preferably also by an intermediate transversely extending portion 48.

Link actuating means are mounted on the frame member 40 adapted for movement on the member 40 in a plane normal to the aligned position of the link means 22, 24, FIG. 2. This is preferably accomplished by providing a pair of transversely spaced carrier plates 50, 52 slidably mounted for longitudinal movement in recesses 54, 55, 56, 57 provided along the inner longitudinal edges of the frame wall members 42, 44, as shown most clearly in FIG. 5. Fixedly attached to the outer sides of the carrier plates 50, 52 for movement therewith, and aligned with the toggle junction at 26, are the link actuating means comprising, in the preferred embodiment, hydraulic cylinder means 70, 72, mounted on the carrier plates 50, 52, and piston rod means 74, 76, extending at one end thereof from the cylinder means 70, 72 and pivotally connected to pin 26 at the other end thereof. Suitable hydraulic connections 78, 79, 80, 81 are provided on the cylinder means for actuating the rods 74, 76 and hence the link means 22, 24 and the movable platen 14.

Adjustment means are provided in the frame member 40 for selectively moving the carrier plates 50, 52 relative to frame member 40 and also for supporting the carrier plates 50, 52 on the frame member 40. In the illustrated, preferred embodiment of this invention, see FIGS. 4 and 5, the adjustment means comprises a shaft 60 rotatably mounted on the axis of the frame member 40 and extending longitudinally through the upper and intermediate portions 46, 48 thereof to adjacent the bottom of the frame member 40. The lower portion of the shaft 60, below the intermediate portion 48 of the frame member 40, is threaded. Mounted on the upper portion 46 of the frame member 40 and connected to the shaft 60 is a shaft rotating means 62, which in the preferred embodiment of the invention comprises a hydraulic motor with suitable hydraulic connections 64, 66, adapted for selectively rotating the shaft 60. A threaded adjustment nut 68 is positioned on the threaded portion of the shaft 60 and is fixedly attached to the carrier plates 50, 52. Thus upon rotation of the shaft 60, the adjustment nut 68 and hence the carrier plates 50, 52 may be selectively moved longitudinally in relation to the frame member 40.

In the preferred embodiment of this invention shown in the drawings, FIGS. 1 and 3, the links 22, 24 are arranged so that the toggle junction at 26 is most remote from the frame member 40 and below the aligned position, FIG. 2, of the link means 22, 24 when the movable platen 14 is in a fully opened position most remote from the fixed platen 12. Movement of the piston rod means 74, 76 from this fully extended position and hence the toggle junction at 26 toward the frame 40 until the links 22, 24 are longitudinally aligned in end-to-end, horizontal, relationship, as in FIG. 2, along the line of thrust of the movable platen 14 closes the platens 12, 14. This particular arrangement is used so that a failure of hydraulic pressure or breakage of the piston rod 74 will result in a tendency of the movable platen 14 to move away from the fixed platen 12—the weight of the links 22, 24 and the piston rod 74 urging the toggle junction at 26 away from the frame member 40. In any event, stop means are provided to prevent movement of the links 22, 24 past the fully extended platen closed position of FIG. 2. In the preferred embodiment such stop means are provided by arranging the bottom 47 of the frame member 40 to abut, as in FIG. 2, the center links 22, 24, FIGS. 3, 7, when the platens 12, 14 are closed.

Because of the particular arrangement of the illustrated embodiment of this invention, adjustment of the open position, FIGS. 6 and 7, is obtained by moving the hydraulic cylinder means 70, 72 away from the line of thrust of the movable platen 14. The piston rod 74 when fully extended will thereby only partially open the platens 12, 14. In the fully open position of the platens 12, 14, FIGS. 1 and 3, the adjustment nut 68 is positioned to be adjacent the lower end of the threaded portion of the rotatable shaft 60. Movement of the nut 68 toward the upper end of the shaft 60 will result in a selectively shorter stroke of the movable platen 14.

In operation, the platens 12, 14 are moved to a fully opened position, FIG. 1, with the piston rod 74 fully extended and with adjustment nut 68 in its lowermost position, FIG. 3. With the injection molding machine thus arranged, molds 20 may be inserted and affixed to the platens 12, 14. By alternately tightening and then loosening the nuts 18 on the rods 16, the distance between the fixed base 10 and the fixed platen 12 may be properly adjusted. After loosening the nuts 18, the molds 20 are closed, FIG. 2, by retracting the piston rod means 74, 76 within the cylinder means 70, 72 until the links 22, 24 abut and are stopped by the bottom 47 of the frame member 40. The nuts 18 are then tightened again to fix the distance between the base 10 and the fixed platen 12. The molds 20 are then opened and the stroke of the platen 14 selectively shortened, FIGS. 6 and 7.

To shorten the stroke of the movable platen 14, the hydraulic motor 62 is activated to rotate the shaft 60. The adjustment nut 68 is thus moved upwardly, FIG. 7, as are the carrier plates 50, 52 and the hydraulic cylinders 70, 72. Thus adjusted, even with the piston rod means 74, 76 in a fully extended position, FIG. 6, the platens 12, 14 are only partially opened. The piston rod means 74, 76 are then reciprocated for operation of the machine. In the preferred two-stage clamping mechanism illustrated in FIGS. 1, 2, and 6 additional clamping force is obtained by actuating piston 8 urging it toward the fixed platen 12 as in FIG. 2, when the links 22, 24 are longitudinally aligned to obtain clamping forces of an extreme magnitude.

Thus it may readily be seen that the present invention provides a highly efficient clamping device in an injection molding machine. By providing an adjustable toggle in such a machine, the stroke may be varied and the efficiency of the machine greatly enhanced. The production volume per unit of time of such a molding machine is increased considerably by shortening its stroke in operation.

It will be understood by those skilled in the art that many modifications of this invention are possible without departing from the true spirit and scope thereof. The description of but a single preferred embodiment of this invention, therefore, is in no way intended to limit the scope of the annexed claims.

What is claimed is:

1. In an injection molding machine, the combination comprising: a clamping platen; a fixed molding platen; a movable molding platen positioned and movable therebetween; a toggle linkage for moving said movable platen including a pair of link means each having inner and outer ends, said link means being pivotally interconnected at their inner ends and respectively pivotally connected at their outer ends, one to said clamping platen and the other to said movable platen, and said link means being adapted for movement between an end-to-end, closed platen position and an angular, open platen position to one side of said closed platen position; stop means for preventing movement of said link means to the other side of said closed platen position; a frame member; a pair of support means each having inner and outer ends, said support means being pivotally connected at their inner ends to said frame member and respectively pivotally connected at their outer ends, one to said clamping platen and the other to said movable platen; link actuating means for moving said link means between said open and closed platen positions, said link actuating means including two pieces adapted for relative reciprocable movement between relatively extended and contracted positions in response to a signal to one of said pieces, one of said pieces being pivotally connected to said toggle junction and the other of said pieces being movable mounted on said frame member; one of said extended and contracted positions operatively defining said open platen position of said link means; and adjustment means on said frame member for moving said other piece between a plurality of alternative operating positions whereby said one position of said actuating means and hence said open platen position of said link means may be selectively adjusted relative to said stop means to thereby vary the distance of movement of said movable platen.

2. The combination of claim 1 wherein said adjustment means comprises: a threaded shaft rotatably mounted on said frame member; threaded adjustment nut means threaded on said shaft and fixedly connected to said other piece of said link actuating means; and means for selectively rotating said shaft to move said nut and said other piece.

3. The combination of claim 1, wherein said frame member abuts said link means when said link means are in said closed platen position, said frame member thereby comprising said stop means.

4. The combination of claim 1, wherein said clamping platen includes fluid pressure actuating means adapted for exerting pressure on said link means when they are in said closed platen position, and wherein said link means and said support means pivotally connected to said clamping platen are pivotally connected at their said outer ends to said actuating means in said clamping platen.

5. The combination of claim 1, wherein said angular position of said link means is below said closed platen position of said link means.

6. The combination of claim 1, wherein said link actuating means comprises a plurality of fluid motors in each of which said one piece is a piston and said other piece is a cylinder.

7. In an injection molding machine, the combination comprising: a clamping platen; a fixed molding platen; a movable molding platen positioned and movable therebetween; a toggle linkage for moving said movable platen including a pair of link means each having inner and outer ends, said link means being pivotally interconnected at their inner ends and respectively pivotally connected at their outer ends, one to said clamping platen and the other to said movable platen, and said link means being adapted for movement between an end-to-end, closed platen position and an angular, open platen position to one side of said closed platen position; a frame member; a pair of support means each having inner and outer ends, said support means being pivotally connected at their inner ends to said frame member and respectively pivotally connected at their outer ends, one to said clamping platen and the other to said movable platen; link actuating means for moving said link means between said open and closed platen positions, said link actuating means including two pieces adapted for relative reciprocable movement between relatively extended and contracted positions in response to a signal to one of said pieces, one of said pieces being pivotally connected to said toggle junction such that relative movement of said two pieces towards said extended position urges said link means towards said open platen position, and the other of said pieces being on said frame member.

8. The combination of claim 7, wherein said clamping platen includes fluid pressure actuating means adapted for exerting pressure on said link means when they are in said closed platen position, and wherein said link means and said support means pivotally connected to said clamping platen are pivotally connected at their said outer ends to said actuating means in said clamping platen.

References Cited
UNITED STATES PATENTS

| | | |
|---|---|---|
| 1,417,993 | 5/1922 | Heeren. |
| 2,371,547 | 3/1945 | Rosenlund et al. ———— 18—30 |
| 2,837,765 | 6/1958 | Harvey. |
| 2,879,545 | 3/1959 | Bailey ———————— 18—43 |
| 2,969,818 | 1/1961 | Allard. |
| 3,015,131 | 1/1962 | Hehl ———————— 18—30 |

WILLIAM J. STEPHENSON, *Primary Examiner.*